(12) United States Patent
Ehlgen et al.

(10) Patent No.: US 8,712,637 B2
(45) Date of Patent: Apr. 29, 2014

(54) METHOD FOR DETERMINING AN OBJECT CLASS OF AN OBJECT, FROM WHICH LIGHT IS EMITTED AND/OR REFLECTED TO A VEHICLE

(75) Inventors: Tobias Ehlgen, Ravensburg (DE); Wolfgang Sepp, Munich (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/591,796

(22) Filed: Aug. 22, 2012

(65) Prior Publication Data

US 2013/0079983 A1 Mar. 28, 2013

(30) Foreign Application Priority Data

Aug. 23, 2011 (DE) .......................... 10 2011 081 428

(51) Int. Cl.
*G06K 9/78* (2006.01)
(52) U.S. Cl.
USPC .......................................................... 701/36
(58) Field of Classification Search
USPC .......................................................... 701/36
See application file for complete search history.

(56) References Cited

U.S. PATENT DOCUMENTS

| | | | | | |
|---|---|---|---|---|---|
| 5,488,700 | A * | 1/1996 | Glassner | ....................... | 345/426 |
| 6,873,912 | B2 * | 3/2005 | Shimomura | ................... | 701/301 |
| 7,379,564 | B2 * | 5/2008 | Kakinami et al. | ............. | 382/104 |
| 7,596,242 | B2 * | 9/2009 | Breed et al. | .................... | 382/103 |
| 7,626,585 | B2 * | 12/2009 | Kondo et al. | ................. | 345/426 |
| 8,301,575 | B2 * | 10/2012 | Bonnet et al. | ................... | 706/12 |
| 2008/0154499 | A1 * | 6/2008 | Tanaka | ........................... | 701/211 |
| 2008/0294315 | A1 * | 11/2008 | Breed | ............................. | 701/49 |
| 2009/0092284 | A1 * | 4/2009 | Breed et al. | .................... | 382/103 |
| 2009/0169096 | A1 * | 7/2009 | Cipolla et al. | ................ | 382/154 |
| 2010/0329513 | A1 * | 12/2010 | Klefenz | ........................ | 382/104 |
| 2013/0058592 | A1 * | 3/2013 | Schwarzenberg | ............ | 382/274 |
| 2013/0101161 | A1 * | 4/2013 | Faber | ............................ | 382/103 |

FOREIGN PATENT DOCUMENTS

| | | |
|---|---|---|
| DE | 103 27 115 | 11/2004 |
| DE | 10 2006 016 073 | 3/2007 |
| DE | 10 2006 004 770 | 5/2007 |
| DE | 10 2006 055 904 | 5/2008 |
| DE | 10 2008 048 309 | 4/2010 |
| DE | 10 2009 042 476 | 4/2010 |
| WO | WO 2006/063675 | 6/2006 |

\* cited by examiner

*Primary Examiner* — Thomas Tarcza
*Assistant Examiner* — Alex C Dunn
(74) *Attorney, Agent, or Firm* — Kenyon & Kenyon LLP

(57) ABSTRACT

A method is provided for determining an object class of an object, from which light is emitted and/or reflected to a vehicle. The method has a step of reading in a first brightness value at a first image position in a first image taken using a first vehicle camera and a second brightness value at a second image position in a second image taken using a second vehicle camera. The first and the second image positions represent an identical position associated with the object in the surroundings of the vehicle. The method further has a step of determining the object class of the object, based on a comparison while using the first brightness value and the second brightness value.

8 Claims, 3 Drawing Sheets

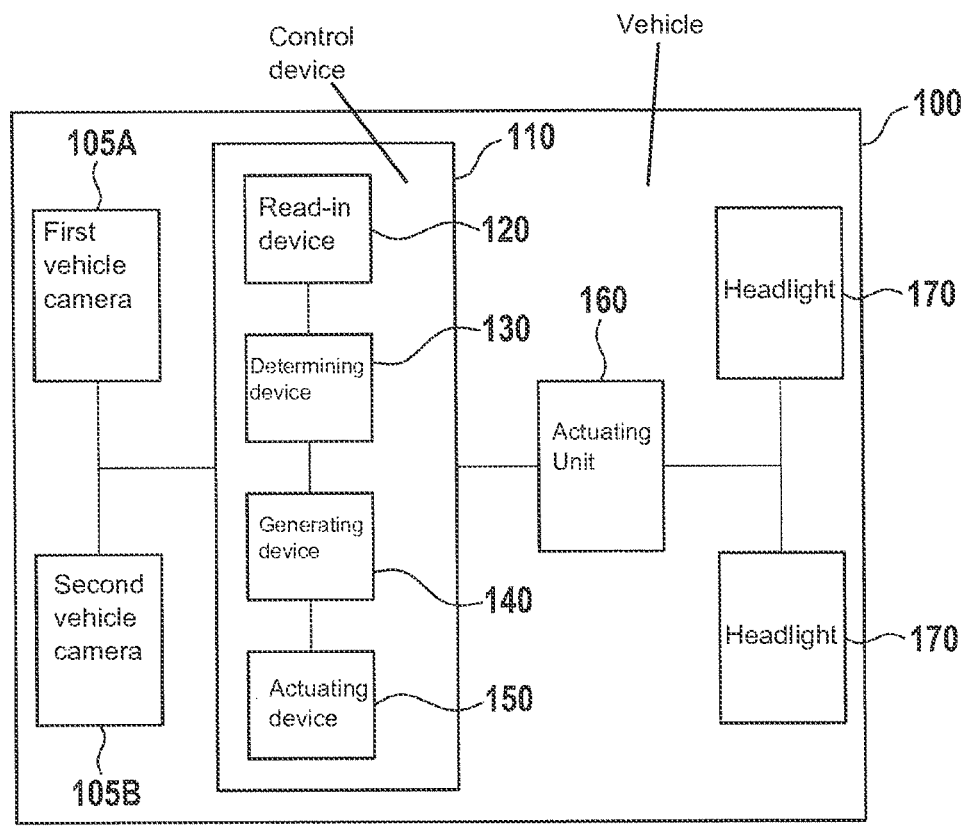
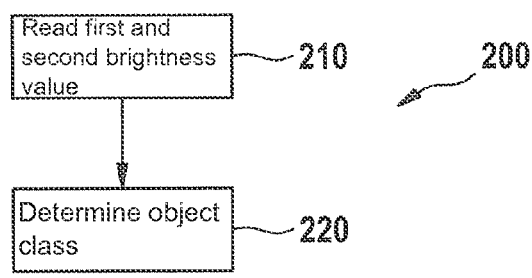

METHOD FOR DETERMINING AN OBJECT CLASS OF AN OBJECT, FROM WHICH LIGHT IS EMITTED AND/OR REFLECTED TO A VEHICLE

CROSS REFERENCE TO RELATED APPLICATION

The present application claims priority to Application No. DE 10 2011 081 428.0, filed in the Federal Republic of Germany on Aug. 23, 2011, which is expressly incorporated herein in its entirety by reference thereto.

FIELD OF INVENTION

The present invention relates to a method for determining an object class of an object, from which light is emitted and/or reflected, a method for controlling a light emission of a headlight of a vehicle, a device which is developed to carry out the steps of one of these methods, as well as a computer program product having program code for carrying out one of these methods, when the program is run on a device.

BACKGROUND INFORMATION

A high-beam assistant is able to detect nonhost vehicles and to switch automatically from high beam to low beam, if another vehicle is being dazzled. It may happen that the high-beam assistant switches erroneously to low beam, although no other vehicles are to be seen. Such a misdetection may come about if the reflections of the host vehicle's high beam are misinterpreted as a nonhost vehicle. One distinction of reflections and light sources is carried out, for example, in monocamera systems with the aid of the course of motion, of the position in the image or the light intensity. This may, however, frequently lead to a misdetection, since, based on the motion of the ego vehicle, or host vehicle (i.e., the vehicle in which the evaluation of the reflections takes place), the trajectory of reflection objects in the image very much corresponds to those of another vehicle at a great distance. The like applies also for the position in the image and the light intensity in the image.

German Application No. DE 10 2009 042 476 A1 describes a method for determining conditions in the surroundings of a motor vehicle using a stereo camera.

SUMMARY

With this as background, the present invention provides a method for determining an object class of an object, from which light is emitted and/or reflected to a vehicle, a method for controlling a light emission of a headlight of a vehicle, a device which is developed to carry out the steps of one of these methods, as well as a computer program product having program code for carrying out one of these methods, when the program is run on a device, according to the present invention. Advantageous refinements are described in the following description.

The present invention describes a method for determining an object class of an object, from which light is emitted and/or reflected, the method having the following steps:

reading in a first brightness value at a first image position in a first image taken using a first vehicle camera, and a second brightness value at a second image position in a second image taken using a second vehicle camera, the first and the second image positions representing an identical position assigned to the object in the surroundings of the vehicle; and determining the object class of the object, based on a comparison while using the first brightness value and the second brightness value.

The object may be situated in the surroundings of the vehicle. In this context, the object may be a headlight of another vehicle or nonhost vehicle, a reflector element of a delineator, a glass pane of a building or vehicle, a traffic sign or the like. The object class may represent a property of the object, based on the property, a classification of the object being possible. The property of the object on which the object class is based may have an optical property. The light may be light generated and emitted by the object or light reflected by the object from another light source, such as a headlight of the vehicle or another vehicle, from a road light or the like. The vehicle may be a motor vehicle, particularly a road-bound motor vehicle, such as a passenger car, a truck, a vehicle for the transport of persons or another type of commercial vehicle. The first vehicle camera and the second vehicle camera are mounted on the vehicle, spatially separated from each other. The first vehicle camera and the second vehicle camera may be part of a stereo camera unit, in this instance, or be embodied as stand-alone cameras that are connected to each other to represent a stereo camera function. The first vehicle camera and the second vehicle camera may have their own image processing device or an image processing device that is usable in common. The first image position may correspond to at least one position of at least one image point of the first image. The second image position may correspond to at least one position of at least one image point of the second image. Consequently, the first brightness value may represent a brightness of at least one image point of the first image. Consequently, the second brightness value may also represent a brightness of at least one image point of the second image. In the comparison of the first brightness value and the second brightness value the same may be combined in a suitable manner. For example, for the comparison, one may form a difference, a sum, an absolute difference, a product, a quotient, etc. of the first brightness value and of the second brightness value. The result of the comparison may be put in relationship to an object class.

The present invention further describes a method for controlling a light emission of at least one headlight of a vehicle, the method having the following steps:

generating control information for controlling the light emission of the at least one headlight, based on an object class determined according to the above mentioned method; and actuating the at least one headlight while using the control information, in order to control the light emission of the at least one headlight.

The at least one headlight may be a front headlight of the vehicle, for example. The light emission of the headlight, in this case, may be changeable in steps or in a stepless manner. The light emission of the headlight may be changed, in this instance, with respect to to the radiation characteristic of the headlight or it may be maintained if the at least one headlight is actuated using control information. The radiation characteristic may refer to a brightness, an illumination angle, a width or size of a roadway area to be illuminated in front of the vehicle, a height of illumination, an illumination pattern, a switching on or off of illumination means and/or the like, which characterize a light emission by the headlights.

The present invention also describes a device that is developed to carry out or implement the steps of the method according to the present invention. The device may particularly have units that are developed to carry out the steps of one of the above mentioned methods. Consequently, the present invention describes a device for determining an object class of an object, from which light is emitted and/or reflected to a vehicle, the device having the following features:

an interface for reading in a first brightness value at a first image position in a first image taken using a first vehicle camera, and a second brightness value at a second image position in a second image taken using a second vehicle camera, the first and the second image positions representing an identical position assigned to the object in the surroundings of the vehicle; and a unit for determining the object class of the object, based on a comparison while using the first brightness value and the second brightness value.

By this exemplary embodiment of the present invention in the form of a device, the object on which the present invention is based may also be attained quickly and efficiently.

In the case at hand, by a device, one may understand an electrical device or a control unit which processes sensor signals and outputs control signals as a function thereof. The device may have an interface, which may be developed as hardware and/or software. In a hardware design, the interfaces may, for example, be part of a so-called system ASIC that contains the most varied functions of the device. However, it is also possible for the interfaces to be separate, integrated switching circuits or to be at least partially made up of discrete components. In a software design, the interfaces may be software modules which are present on a microcontroller in addition to other software modules, for example.

An advantageous development also includes a computer program product having program code that is stored on a machine-readable medium such as a semiconductor memory, a hard-disk memory or an optical memory, which is used to implement the method according to one of the exemplary embodiments described above, when the program is run on a device.

The present invention is based on the knowledge that, while using brightness values of image positions in two images taken using two cameras, an object class of an object in the surroundings of the vehicle is able to be ascertained advantageously. Thus, using a stereo camera system, for example, objects or light objects in the vehicle surroundings may be observed from various viewing angles, for instance, a light intensity, brought about in the images by reflection by delineators, being more greatly dependent on the viewing angle than in the case of light sources brought on by headlights, for example.

One advantage of the present invention is that, in this case, images of a stereo camera unit of a stereo system, that is often already installed in mass production in vehicles, may be used to minimize misdetection with respect to an object class. Consequently, an object may be classified with greater accuracy as well as reliability, expenditure and space requirement being held small. Based on a correctly determined object class, various vehicle functions, for example, may also be supplied with reliable input variables, or rather, advantageous applications are possible. For instance, in a stereo-based headlight control, the correctly determined object class may have the effect of avoiding erroneous dimming. In particular, it may be avoided, in this connection, that a headlight assistant switches erroneously into lower beam, in spite of the fact that there are no other vehicles in the image and in the surroundings of the vehicle, but only light reflections are being received.

In the method for determining an object class, in the step of determining, the object is able to be classified into the object class of reflecting objects if a value of a linkage of the first brightness value to the second brightness value is greater than a threshold value. In this connection, a comparison result formed from the first brightness value and the second brightness value, for example, may represent, for instance, an absolute difference or the like, a value of a brightness difference, which represents the presence of a reflecting object. The threshold value may correspond to a value of a brightness difference, at the exceeding of which an object is detected or valued as a reflecting object. The threshold value may be suitably selected to enable a meaningful object classification. The threshold value may take into account a tolerance range with respect to brightness values. The tolerance range may amount to 1%, 2%, 3%, 5% or 10% of a brightness value, for example. Such a threshold-value decision has the advantage that the accuracy in the object classification is increased, and that a correct object classification is thus made possible.

In the method for determining the object class, in the step of determining, the object is able to be classified into the object class of reflecting objects if a value of a linkage of the first brightness value to the second brightness value is greater than a threshold value. In this connection, a comparison result formed from the first brightness value and the second brightness value, for example, may represent, for instance, an absolute difference or the like, a value of a brightness difference, which represents the presence of a reflecting object. The threshold value may correspond to a value of a brightness difference, at the undershooting of which a reflecting object is present. The threshold value may be suitably selected to enable a meaningful object classification. The threshold value may take into account a tolerance range with respect to the brightness values, as was mentioned before. Such an exemplary embodiment also has the advantage that the accuracy in the object classification is increased, and that a correct object classification is thus made possible.

A step of detecting the first image position, based on a comparison of parameters of a plurality of image points in a first image area in the first image, and the detecting of a second image position, based on a comparison of parameters of a plurality of image points in a second image area in the second image may also be provided. Hereby, for example, at least one image point, whose brightness value represents a maximum, relative maximum or the like in the image, may be recognized as the image position. Such an exemplary embodiment offers the advantage that the images are thus able to be analyzed, so that one may recognize suitable image positions for the object classification. If necessary, image positions may, for example, also be filtered out, in this context, which represent undesired areas of the surroundings of the vehicle. Thus, for example, road lights may be excluded from the object classification.

Furthermore, a step of checking may be provided as to whether the first and the second image positions represent an identical position assigned to the object in the surroundings of the vehicle. In this context, the first image position in an image in a raster, coordinate system or the like in the first image does not need to be situated at the same place as the second position in the second image. For the first vehicle camera and the second vehicle camera are able to image at least partially overlapping cutouts of the surroundings of the vehicle. Consequently, in the step of checking, the image positions belonging together are able to be ascertained which correspond, or are assigned, to the same object in the surroundings of the vehicle. Such an exemplary embodiment offers the advantage that one is able to make certain that the first image position and the second image position are both assigned to the same object in the surroundings of the vehicle.

Moreover, a step may be provided of determining the first brightness value while using the first image and the second brightness value while using the second image. The first brightness value, in this instance, may also represent an average of the brightnesses of a plurality of image points in the first image. The second brightness value may also represent an average of the brightnesses of a plurality of image points in the second image. Such an exemplary embodiment offers the advantage that from each image a correct brightness value is determined and provided for the object classification.

In the method for controlling the light emission, in the step of actuating the light emission of the at least one headlight, a change may be made from a first radiation characteristic to a second radiation characteristic, if the control information gives a hint that there is a self-luminous classified or determined object present. The light emission of the at least one headlight may be maintained at the first radiation characteristic if the control information gives a hint that there is a reflecting determined object present. The control information may be regarded as a control signal, in this instance. The first radiation characteristic may, for instance, correspond to an upper beam or be similar to it. The second radiation characteristic may, for instance, correspond to a lower beam or be similar to it. Such an exemplary embodiment offers the advantage that unnecessary dimming is able to be avoided in response to reflecting objects, for example. By contrast, if a self-luminous object is present, one may reliably dim the lights, and thus dazzling other traffic participants may be effectively avoided.

Exemplary embodiments of the present invention are explained in greater detail with reference to the accompanying drawings.

BRIEF DESCRIPTION OF THE DRAWINGS

FIG. 1 schematically illustrates a vehicle having a control device according to an exemplary embodiment of the present invention.

FIGS. 2 and 3 illustrate flow charts of methods according to exemplary embodiments of the present invention.

DETAILED DESCRIPTION

Figure 3:
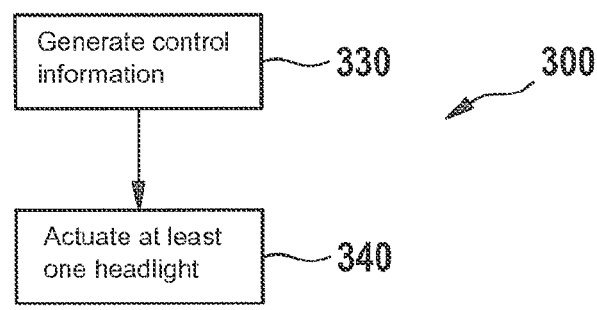

In the figures, same or similar elements may be shown by same or similar reference numerals, a repeated description of these elements being omitted. Furthermore, the figures in the drawings, their description and the claims contain numerous features in combination. In this context, it is clear to one skilled in the art that these features may also be considered individually or may be combined to form further combinations not explicitly described here. Furthermore, the present invention will perhaps be explained in the following description using different measures and dimensions, while the present invention should be understood as not being restricted to these measures and dimensions. Furthermore, method steps according to the present invention may also be carried out repeatedly, as well as in a different sequence than the one described. If an exemplary embodiment includes an "and/or" linkage between a first feature/step and a second feature/step, this may be read to mean that the exemplary embodiment, according to one specific embodiment has both the first feature/step and also the second feature/step, and according to an additional specific embodiment, either has only the first feature/step or only the second feature/step.

FIG. 1 shows a schematic representation of a vehicle 100 having a control device according to an exemplary embodiment of the present invention. Vehicle 100 has a first vehicle camera 105A, a second vehicle camera 105B, a control device 110 having a read-in device 120, a determining device 130, a generating device 140 as well as an actuating device 150, an actuating unit 160 and two headlights 170. First vehicle camera 105A and second vehicle camera 105B are connected to control device 110 via a communications interface, for instance, each via a signal line. Actuating unit 160 is connected to control device 110 via a communications interface, for example, in each case via at least one signal line. Consequently, control device 110 is connected between vehicle cameras 105A and 105B and actuating unit 160. Headlights 170 are connected to actuating unit 160 via a communications interface, for example, via at least one signal line. Consequently, actuating unit 160 is connected between control device 110 and headlights 170. Even though it is not shown this way in FIG. 1, actuating unit 160 may also be a part of control device 110, or control device 110 may also be a part of actuating unit 160. Furthermore, vehicle cameras 105A and 105B may be parts of a stereo camera unit, which is not shown in FIG. 1.

First vehicle camera 105A may have an image processing electronic device. Second vehicle camera 105B may also have an image processing electronic device. Alternatively or in addition, vehicle cameras 105A and 105B may have a common image processing electronic device (not shown). Vehicle cameras 105A and 105B are developed to take one image, in each case, of the surroundings of vehicle 100, for instance, in front of the vehicle in the travel direction, and to emit it in the form of image information and an image signal to control device 110.

Control device 110 is developed to receive the image information, or rather the image signal, from first vehicle camera 105A and the image information, or rather the image signal, from second vehicle camera 105B. In this context, the image data or image signals may represent a first brightness value at a first image position in the first image taken using first vehicle camera 105A and a second brightness value at a second image position in the second image taken using second vehicle camera 105B. The first and the second image positions represent an identical position associated with the object in the surroundings of the vehicle 100, in this case. Alternatively, the brightness values and/or the image positions may also be determined or detected using suitable devices (not shown) of control device 110. Control device 110 has read-in device 120, determination device 130, generating device 140 as well as actuating device 150. Control device 110 is developed to carry out a determination of an object class of an object, from which light is emitted and/or reflected to a vehicle 100, as well as a control of a light emission of headlights 170 of vehicle 100.

Read-in device 120 is developed to receive image data, or rather, image signals from vehicle cameras 105A and 105B. Read-in device 120 is developed to read in the first brightness value at the first image position in the first image taken using first vehicle camera 105A and the second brightness value at the second image position in the second image taken using second vehicle camera 105B. The first and the second image positions represent an identical position associated with the object in the surroundings of the vehicle 100, in this case. Read-in device 120 is able to emit information via the read-in brightness values to determination device 130.

Determination device 130 is developed to receive the information regarding read-in brightness values from read-in device 120. Determination device 130 is developed to determine an object class of the object based on a comparison of the first brightness value and the second brightness value. If the brightness values deviate from each other by more than a specified measure, determination device 130 is able to classify the object into the object class of reflecting objects. If the brightness values deviate from each other by less than a specified measure, determination device 130 is able to classify the object into the object class of self-luminous objects. Determination device 130 is developed to output information regarding the determined object class to generating device 140.

Generating device 140 is developed to receive the information regarding the determined object class from determination device 130. Generating device 140 is also developed, based on the determined object class, to generate control information for controlling the light emission of the at least one headlight. Generating device 140 is developed to output the control information to actuating device 150.

Actuating device 150 is developed to receive the control information from generating device 140. Actuating device 150 is developed to actuate headlights 170 while using the control information, in order to control the light emission of the at least one headlight. Actuating device 150 may also be developed to output actuating information to actuating unit 160.

Actuating unit 160 is developed to receive the actuating information from actuating device 150 of control device 110. Actuating device 160 is also developed to generate an actuating signal for controlling headlights 170. In the generation of the actuating signal, actuating unit 160 is able to take into account, or rather, use the actuating information from control device 110. Consequently, the actuating signal may contain actuating information. In addition to the actuating unit information, the actuating signal may also contain or be based on control data from other vehicle units. Actuating unit 160 is developed to output the actuating signal to headlights 170.

Headlights 170 are able to receive the actuating signal from actuating unit 160. The actuating information, that is taken into account in the actuating signal, may have the effect that the light emission to a determined object class of an object is adjusted in the surroundings of vehicle 100.

FIG. 2 shows a flow chart of a method 200 for determining an object class of an object, from which light is emitted and/or reflected to a vehicle, according to one exemplary embodiment of the present invention. Method 200 has a step of reading in 210 a first brightness value at a first image position in the first image taken using a first vehicle camera and a second brightness value at a second image position in the second image taken using a second vehicle camera. The first and the second image positions represent an identical position associated with the object in the surroundings of the vehicle, in this case. Method 200 also has a step of determining 220 the object class of the object, based on a comparison while using the first brightness value and the second brightness value. Method 200 may advantageously be carried out in connection with a device, such as the control device in FIG. 1. Consequently, the control device or the apparati of the control device in FIG. 1 may be developed to carry out the steps of method 200.

FIG. 3 shows a flow chart of a method 300 for controlling a light emission of at least one headlight of a vehicle, in accordance with one exemplary embodiment of the present invention. Method 300 has a step of generating 330 control information for controlling the light emission of the at least one headlight, based on an object class determined, for instance, according to the method according to the exemplary embodiment shown in FIG. 2. Furthermore, method 300 has a step of actuating 340 the at least one headlight while using the control information, in order to control the light emission of the at least one headlight. Method 300 may advantageously be carried out in connection with a device, such as the control device in FIG. 1. Consequently, the control device or the apparati of the control device in FIG. 1 may be developed to carry out the steps of method 300.

Figure 4:
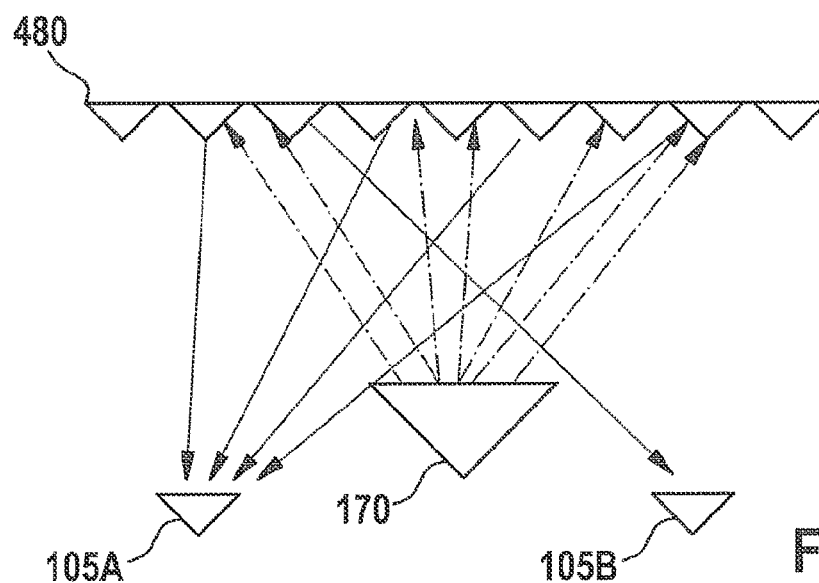
FIG. 4 illustrates a representation of an object at a time during an object classification according to an exemplary embodiment of the present invention.

FIG. 4 shows a representation of an object at a time during an object classification according to an exemplary embodiment of the present invention. What is shown is a first vehicle camera 105A, a second vehicle camera 105B, a headlight 170 and an object 480. First vehicle camera 105A, second vehicle camera 105B and headlight 170 may be a part of a vehicle, such as the vehicle in FIG. 1. First vehicle camera 105A and second vehicle camera 105B may be parts of a stereo camera or a stereo camera unit. Headlight 170 may thus be a vehicle headlight, and particularly a front headlight. Object 480 may be a reflector on a delineator, for example. Headlight 170 illuminates object 480. Consequently, light beams of light emitted by headlight 170 fall on a reflecting surface of object 480. The light beams of the emitted light are shown in FIG. 4 as arrows having arrow tips pointing to object 480. The reflecting surface of object 480 is shown in cross section in FIG. 4, and has a serrated profile that has projections that come to a point. The reflecting surface of object 480 could also have a different cross sectional profile, however. The reflecting surface of object 480 reflects the light emitted by headlight 170. A part of the light is reflected to first vehicle camera 105A and a part to second vehicle camera 105B. Based on the cross sectional profile and the angle of incidence of the light at the reflecting surface of the object, first vehicle camera 105A and second vehicle camera 105B receive a different quantity of light, light intensity, brightness, etc. of the reflected light. The light beams of the reflected light are shown in FIG. 4 as arrows having arrow tips pointing to vehicle cameras 105A and 105B. Based on the quantities of light received, light intensities, brightnesses, etc. of the reflected light, the method of FIG. 2 and possibly additionally the method of FIG. 3 or additional applications may advantageously be carried out.

According to the exemplary embodiment shown in FIG. 4, the properties of reflector 480, which is scattering in a greatly different manner, are used to classify it as reflecting. Based on the structure of reflector 480 on the delineator, a different quantity of reflected light reaches individual cameras 105A and 105B of the stereo system. This difference may now be determined and used for the determination as to whether a delineator is involved or not. In the present case in FIG. 4, the method of FIG. 2 is able to determine that the object class of the object, i.e., the reflector, is reflecting. In case reflection is not involved, but a light source, such as the front lights of another vehicle, the oncoming light in the two cameras 105A and 105B would be equally strong within a tolerance range, and there would not be a sufficiently great difference pointing to an object of the object class for reflecting objects.

Figure 5:
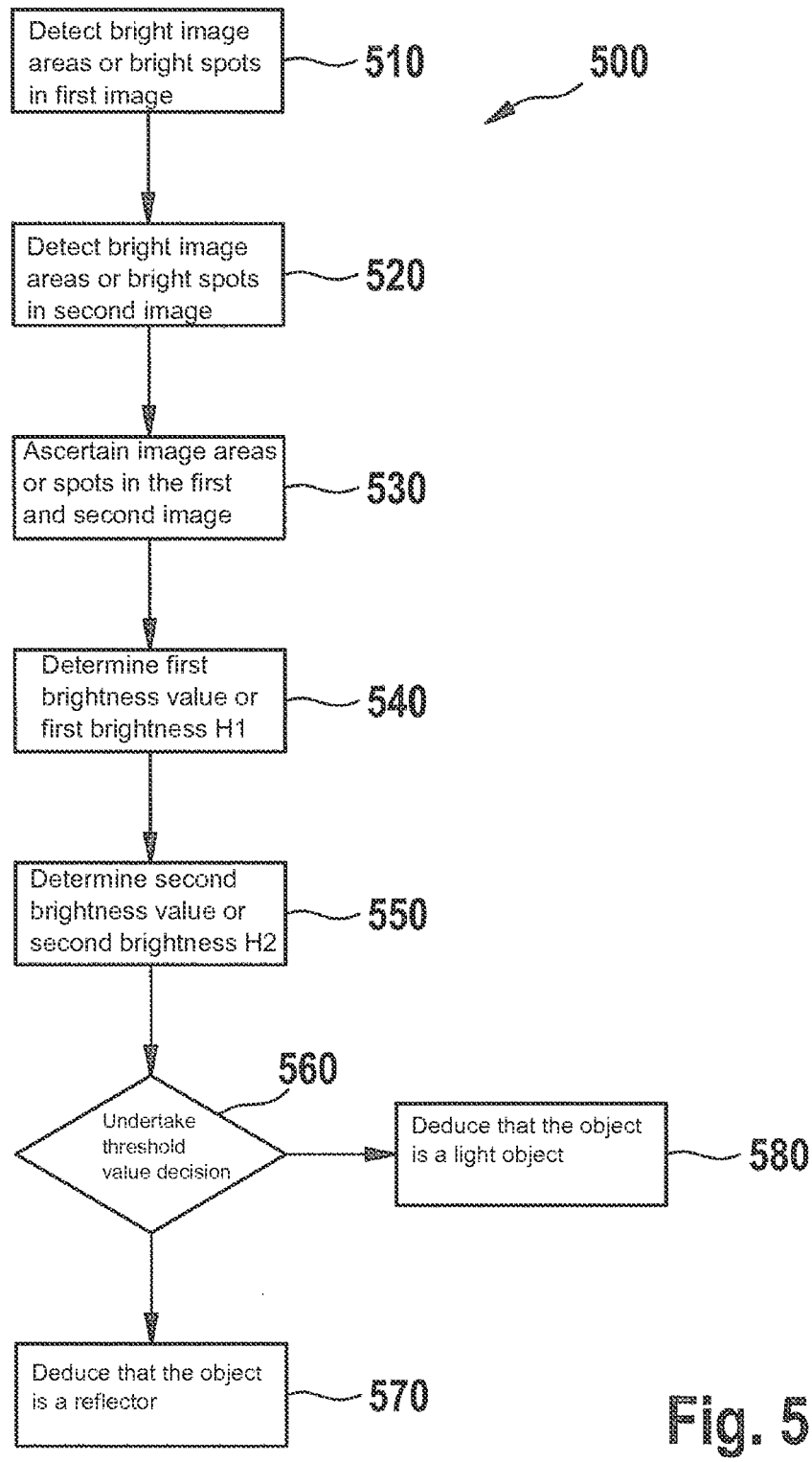
FIG. 5 illustrates a flow chart of an algorithm according to an exemplary embodiment of the present invention.

FIG. 5 shows a flow chart of an algorithm 500 for determining an object class of an object, from which light is emitted and/or reflected to a vehicle, according to one exemplary embodiment of the present invention. In a first step 510, bright image areas or bright spots are detected in a first image. In an additional step 520 (which may also be carried out in parallel to first step 510), bright image areas or bright spots are detected in a second image. In a further step 530, associated image areas or spots are ascertained in the first image and the second image. In a further step 540, a first brightness value or a first brightness H1 is determined in an image area or spot in the first image. In a further step 550, a second brightness value or a second brightness H2 is determined in an image area or spot in the second image. In a subsequent step 560, based on a comparison of the first brightness H1 and the second brightness H2, a threshold value decision is undertaken, which may be based on the equation $$|H1-H2|>\text{threshold value}$$

In an additional step 570, based on a first result of the threshold-value decision, it is deduced that the object is a reflector. In an additional step 580, based on a second result of the threshold value decision, that is different from the first result, it is deduced that the object is a light object, i.e., an object that is self-luminous. Algorithm 500 may advantageously be carried out in connection with a device, such as the control device in FIG. 1, or in connection with a method, such as the method in FIG. 2. In addition, algorithm 500 may provide at least one input variable for a method, such as the method in FIG. 3.

What is claimed is:

1. A method for determining an object class of an object, from which light is at least one of emitted and reflected to a vehicle, the method comprising:
    reading in a first brightness value at a first image position in a first image taken using a first vehicle camera, and a second brightness value at a second image position in a second image taken using a second vehicle camera, the first and second image positions representing an identical position assigned to the object in surroundings of the vehicle;
    detecting the first image position based on a comparison of parameters of a plurality of image points in a first image area in the first image;
    detecting the second image position based on a comparison of parameters of a plurality of image points in a second image area in the second image; and
    determining the object class of the object based on a comparison of the first brightness value and the second brightness value.

2. The method according to claim 1, wherein, during the determining, the object is classified into an object class of reflecting objects if a value of a linkage of the first brightness value to the second brightness value is greater than a threshold value.

3. The method according to claim 1, wherein, during the determining, the object is classified into an object class of self-luminous objects if a value of a linkage of the first brightness value to the second brightness value is less than a threshold value.

4. The method according to claim 1, further comprising: checking whether the first and second image positions represent the identical position assigned to the object in the surroundings of the vehicle.

5. A method for controlling a light emission of at least one headlight of a vehicle (100), the method comprising:
    generating control information for controlling the light emission of the at least one headlight based on the object class determined according to the method according to claim 1; and
    actuating the at least one headlight while using the control information in order to control the light emission of the at least one headlight.

6. The method according to claim 5, wherein, during the actuating, the light emission of the at least one headlight is one of (i) changed from a first radiation characteristic to a second radiation characteristic if the control information gives a hint of an object determined to be self-luminous, and (ii) maintained at the first radiation characteristic if the control information gives a hint of an object determined to be reflecting.

7. A device configured to carry out one of (i) the method according to claim 1 and (ii) the method according to claim 5.

8. A computer program product having program code stored on a non-transitory computer-readable medium, wherein the program code instructs a programmable computer system to perform one of (i) the method according to claim 1 and (ii) the method according to claim 5.

* * * * *